United States Patent
Tillotson

(10) Patent No.: US 10,652,441 B1
(45) Date of Patent: May 12, 2020

(54) SYSTEMS AND METHODS FOR PROTECTING IMAGING DEVICES AGAINST HIGH-RADIANT-FLUX LIGHT

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/409,395

(22) Filed: May 10, 2019

(51) Int. Cl.
*H04N 5/225* (2006.01)
*G02B 7/02* (2006.01)
*H05G 2/00* (2006.01)

(52) U.S. Cl.
CPC ......... *H04N 5/22521* (2018.08); *G02B 7/021* (2013.01); *H04N 5/2253* (2013.01); *H04N 5/2254* (2013.01); *H05G 2/008* (2013.01)

(58) Field of Classification Search
CPC .............. H04N 5/22521; H04N 5/2254; H04N 5/2253; G02B 7/021; H05G 2/008; H01J 2237/24445; H01J 37/00; H01J 2237/2445; H01J 2237/2444; H01J 2237/244; H01J 2237/24475; H01J 2237/2447; H01J 2237/2446; H01J 2237/2448; H01J 2237/24485; H01J 2237/2449
See application file for complete search history.

(56) References Cited

U.S. PATENT DOCUMENTS

| | | | | |
|---|---|---|---|---|
| 3,433,555 A | * | 3/1969 | Tomlinson | H01S 3/0064 359/297 |
| 4,598,247 A | * | 7/1986 | Mako | G01R 23/163 324/76.12 |
| 4,978,182 A | | 12/1990 | Tedesco | |
| 5,164,592 A | * | 11/1992 | Kitamori | H01J 49/164 250/281 |

(Continued)

FOREIGN PATENT DOCUMENTS

| | | |
|---|---|---|
| EP | 1467237 A1 | 10/2004 |
| GB | 1133514 A | 11/1968 |
| GB | 2472130 A | 1/2011 |

OTHER PUBLICATIONS

Extended European Search Report dated Jun. 14, 2017 issued in European Patent Application No. 16204968.8.

*Primary Examiner* — Chiawei Chen
(74) *Attorney, Agent, or Firm* — Ostrager Chong Flaherty & Broitman, P.C.

(57) ABSTRACT

Systems and methods for preventing high-radiant-flux light, such as laser light or a nuclear flash, from causing harm to imaging devices, such as a camera or telescope. The optical components of the imaging device have first and second foci. The second focus forms an image on an array of photodetectors and occurs at a large f-number. The first focus occurs at a small f-number in a gas that is dense enough to dissipate most of a femtosecond laser pulse of potentially damaging intensity and conditioned to easily undergo dielectric breakdown when exposed to high-radiant-flux light that is less intense than a femtosecond laser pulse. Dielectric breakdown forms a conductive arc that dissipates or scatters light, blocking high-radiant-flux light from reaching the array of photodetectors. Several methods may be used for conditioning the gas to break down quickly when exposed to laser attack.

24 Claims, 10 Drawing Sheets

(56) References Cited

U.S. PATENT DOCUMENTS

| | | | | |
|---|---|---|---|---|
| 5,250,808 A * | 10/1993 | Danilatos | .............. | H01J 37/244 250/310 |
| 5,831,769 A | 11/1998 | Smith | | |
| 6,652,778 B1 | 11/2003 | Twarowski | | |
| 7,202,852 B2 | 4/2007 | Harvie | | |
| 7,344,260 B2 | 3/2008 | Derenski | | |
| 10,587,107 B2 * | 3/2020 | Morden | ................ | F16B 41/002 |
| 2007/0139632 A1 * | 6/2007 | Shiraishi | ............. | G03F 7/70858 355/55 |
| 2013/0048878 A1 * | 2/2013 | Mizoguchi | ............. | H05G 2/005 250/492.1 |
| 2013/0135601 A1 * | 5/2013 | Okazaki | ............... | G03B 27/522 355/67 |
| 2014/0363978 A1 * | 12/2014 | Martin | ................ | H01J 37/3053 438/712 |
| 2020/0067259 A1 * | 2/2020 | Masuda | ................ | H01S 3/1305 |

\* cited by examiner

SYSTEMS AND METHODS FOR PROTECTING IMAGING DEVICES AGAINST HIGH-RADIANT-FLUX LIGHT

BACKGROUND

This disclosure generally relates to systems and methods for the protection of imaging devices against light having a high radiant flux. As used herein, the term "high-radiant-flux light" means light having any one or more of the following measurable properties: high radiant intensity (W/sr), high irradiance (W/m$^2$) or high radiance (W·sr$^{-1}$·m$^{-2}$). Such high-radiant-flux light may be coherent (e.g., laser light) or incoherent.

When operating a vehicle equipped with optical sensors, the general problem to be overcome is how to achieve high probability of mission success, at acceptably low cost, despite hazards. A hazard of increasing concern is high-radiant-flux light, which can damage optical sensors (hereinafter "image sensors") needed to (a) operate a vehicle safely or (b) collect data, such as agricultural data or military surveillance data. This hazard usually arises from lasers aimed at a vehicle. However, it may also arise from arc welding equipment, exceptionally large or hot fires, a lightning bolt, or a nuclear blast.

Imaging devices, such as cameras and telescopes, are especially vulnerable to high-radiant-flux light. By design, such imaging devices use a lens or mirror to focus light onto an image sensor such as a focal plane array of opto-electrical elements that convert impinging light to electrical signals (hereinafter "array of photodetectors") that acquire pixel data representing an image. This greatly increases the light intensity on the photodetectors corresponding to the location of the high-radiant-flux light source in the image. Thus, light that is harmless to a structural surface may have damaging radiant flux at the image sensor. The high-radiant-flux light can damage the image sensor by thermal shock, melting, or other mechanisms. A mechanism of particular concern is multi-photon absorption, which occurs when a femtosecond laser pulse strikes the surface of the image sensor. (As used herein, the term "femtosecond laser pulse" means a laser pulse having a pulse duration greater than or equal to one femtosecond but less than one picosecond.)

One approach to solving this problem is to shield or block electronic equipment from the high-radiant-flux light. A light-triggered shutter suffices for the weakest threats, such as accidental exposure to lasers used in a light show. Such a solution is insufficient for the more intense light encountered in military situations due to reaction time delays in such a system. An optical filter tuned to the specific laser wavelength works when the threat wavelength is known, but is ineffective against lasers with variable or unknown wavelength.

It would be advantageous to equip imaging devices with protection systems that can block even short, high-intensity laser pulses (e.g. femtosecond laser pulses) before the pulses damage the image sensor, and to do so across a wide range of wavelengths.

SUMMARY

The subject matter disclosed in detail below is directed to systems and methods for preventing high-radiant-flux light, such as laser light or a nuclear flash, from causing harm to imaging devices, such as a camera or telescope. The imaging device includes a two-image-plane optical system. The first image plane occurs at a small f-number in a gas that is dense enough to dissipate most of a femtosecond laser pulse of potentially damaging intensity and conditioned to easily undergo dielectric breakdown when exposed to high-radiant-flux light that is less intense than a femtosecond laser pulse of potentially damaging intensity. Dielectric breakdown in the gas forms a conductive arc that transforms incoming high-radiant-flux light into other forms of energy, thereby blocking the high-radiant-flux light that might damage the image sensor located in the second image plane. Several methods may be used for conditioning a volume of gas to ionize quickly when exposed to laser attack. The ionization process absorbs some of the laser energy, and the opaque ionized region absorbs the rest. Then the electrons and ions recombine, restoring the gas to its original state.

In accordance with some embodiments, the two-image-plane optical system has at least an objective lens that gathers light from the scene being observed and focuses the light rays to produce a real image (hereinafter "first lens") and an image-erecting lens (hereinafter "second lens"). The optical components of the optical system focus light at a first image plane and a second image plane. An image sensor (e.g., a photodetector array) situated at the second image plane senses impinging light. The second image plane is located at a large f-number, while the first image plane is located at a small f-number from respective lenses. In other words, the first focal length from the first lens to the first image plane is less than the second focal length from the second lens to the second image plane. The two lenses are separated by a volume of space filled with a gas comprising atoms that are physically large and easy to ionize and have a large number of electrons, such as xenon or krypton. Typically the two lenses form the front and back walls of a gas-filled chamber, also partly bounded by the lens tube of the imaging device. The first image plane lies within the chamber, i.e., in the gas-filled region. The amount of gas in the chamber is chosen to provide higher pressure than the standard atmosphere (i.e., a unit of pressure defined as 14.696 psi). Laser protection occurs at the first image plane, where the gas dissipates the laser pulse by transforming the energy of the laser pulse into other forms of energy.

Although various embodiments of systems and methods for protecting imaging devices against high-radiant-flux light are described in some detail later herein, one or more of those embodiments may be characterized by one or more of the following aspects.

One aspect of the subject matter disclosed in detail below is an imaging device comprising: a lens tube that partly bounds a volume of space; a first lens supported by the lens tube and having a first focal length; a second lens supported by the lens tube and positioned to receive light from the first lens, wherein the second lens is separated from the first lens by a distance greater than the first focal length; and an image sensor supported by the lens tube and positioned to receive light from the second lens, wherein the image sensor is disposed within the volume of space, wherein the lens tube and the first and second lenses bound a chamber filled with a gas that includes a sufficiently high fraction of elemental gas or elemental gases such that dielectric breakdown is configured to occur in the gas when exposed to a femtosecond laser pulse of potentially damaging intensity. In accordance with some embodiments, the gas comprises an elemental gas that is an inert gas (a.k.a., noble gas) having a mean molecular weight which is equal to or greater than the mean molecular weight of krypton. In one embodiment, the gas further comprises an elemental gas that is not an inert gas, such as tritium. In one proposed implementation, the second lens has a second focal length greater than the first focal length and the pressure of the gas is greater than one standard atmosphere.

In accordance with some alternative embodiments, the imaging device further comprises means for maintaining an excess of free electrons in the elemental gas-filled portion of the volume of space. The corresponding structure for maintaining an excess of free electrons in the gas includes the following options: a radioisotope, an x-ray source and a source of ultraviolet radiation.

In accordance with other alternative embodiments, the imaging device further comprises means for maintaining an electric field in the elemental gas-filled portion of the volume of space. The corresponding structure for maintaining an electric field includes a voltage source connected to one of the following: (a) a pair of electrodes on opposite sides of the elemental gas-filled portion of the volume of space; (b) a pair of interleaved conductor combs deposited on an optically-transparent substrate at a first image plane; or (c) electrically conductive walls. In some embodiments, the image sensor comprises rows of photodetectors separated by gaps and the means for maintaining an electric field in the first chamber comprise interleaved conductor combs having comb teeth spaced to produce shadows aligned with the gaps.

Another aspect of the subject matter disclosed in detail below is an imaging device comprising: a lens tube that partly bounds a volume of space; a window/corrector plate supported by the lens tube; a perforated primary mirror supported by the lens tube and positioned to receive light from the window/corrector plate, wherein the perforated primary mirror has a first focal length; a concave secondary mirror positioned to receive light from the perforated primary mirror and having a second focal length greater than the first focal length; and an image sensor supported by the lens tube and positioned to receive light from the concave secondary mirror, wherein the image sensor is disposed within the volume of space, wherein a portion of the volume of space disposed between the perforated primary mirror and the concave secondary mirror is filled with a gas that includes a sufficiently high fraction of elemental gas or elemental gases such that dielectric breakdown is configured to occur in the gas when exposed to a femtosecond laser pulse of potentially damaging intensity. In accordance with some embodiments, the gas comprises an elemental gas that is an inert gas having a mean molecular weight which is equal to or greater than the mean molecular weight of krypton. In some embodiments, the pressure of the gas is greater than one standard atmosphere.

A further aspect of the subject matter disclosed in detail below is a method for preventing high-radiant-flux light from damaging an image sensor, the method comprising: (a) emitting particles or electromagnetic radiation into a volume of gas inside a lens tube, wherein the gas includes a sufficiently high fraction of elemental gas or elemental gases such that dielectric breakdown will occur in the gas when exposed to a laser pulse of potentially damaging intensity during emission of the particles or the electromagnetic radiation; (b) focusing incoming non-high-radiant-flux light in a first image plane within the lens tube; (c) subsequent to step (b), focusing the non-high-radiant-flux light in a second image plane at an image sensor inside the lens tube; and (d) subsequent to step (c), focusing incoming high-radiant-flux light in the first image plane, thereby inducing dielectric breakdown in the gas that transforms the high-radiant-flux light into other forms of energy. In accordance with some embodiments, the gas comprises an inert gas having a mean molecular weight which is equal to or greater than the mean molecular weight of krypton. In one embodiment, the gas further comprises an elemental gas that is not an inert gas, such as tritium.

Yet another aspect of the subject matter disclosed in detail below is a method for preventing high-radiant-flux light from damaging an image sensor, the method comprising: (a) generating an electric field in a volume of gas inside a lens tube, wherein the gas includes a sufficiently high fraction of elemental gas or elemental gases such that dielectric breakdown will occur in the gas when exposed to a femtosecond laser pulse of potentially damaging intensity during generation of the electric field; (b) focusing incoming non-high-radiant-flux light in a first image plane within the lens tube; (c) subsequent to step (b), focusing the non-high-radiant-flux light in a second image plane at an image sensor inside the lens tube; and (d) subsequent to step (c), focusing incoming high-radiant-flux light in the first image plane, thereby inducing dielectric breakdown in the gas that transforms the high-radiant-flux light into other forms of energy.

Other aspects of systems and methods for protecting imaging devices against high-radiant-flux light are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 6A is a diagram representing a sectional view of the optically-transparent substrate with interleaved conductor combs depicted in FIG. 6, the section being taken in a plane indicated by chain line 6A-••-6A.

Reference will hereinafter be made to the drawings in which similar elements in different drawings bear the same reference numerals.

DETAILED DESCRIPTION

Illustrative embodiments of systems and methods for the protection of imaging devices against high-radiant-flux light are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
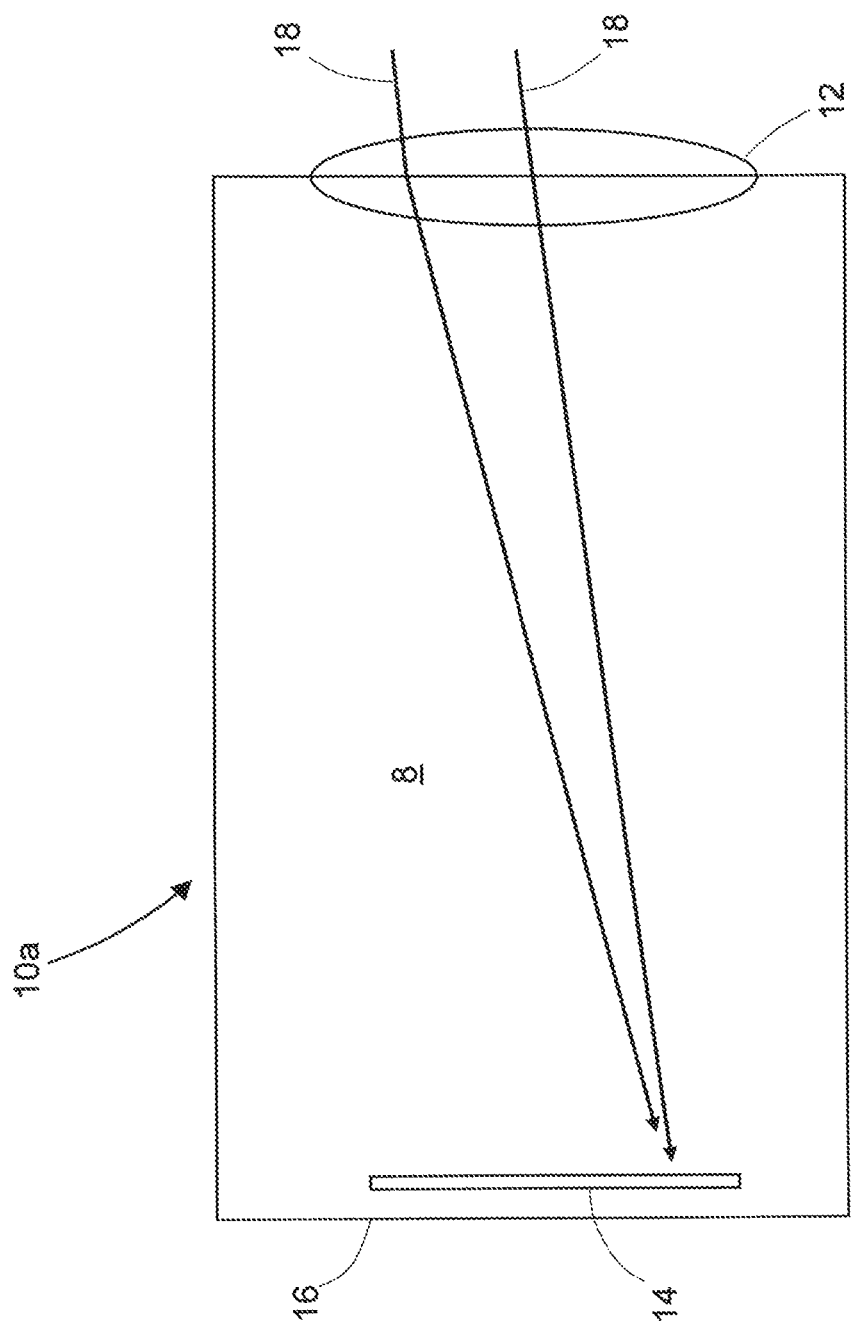
FIG. 1 is a diagram representing an imaging device that is focusing incoming light onto an image plane, thereby increasing the light's intensity.

By design, an imaging device uses a lens or mirror to focus light onto an image sensor. FIG. 1 depicts an imaging device that has a lens 12, an image sensor 14 and a lens tube 16. The lens tube 16 and lens 12 bound a volume of space 8. The lens tube 16 has an aperture through which incident light enters the volume of space 8 and propagates on its way to the image plane located at the image sensor 14. The arrows in FIG. 1 indicate optical paths of respective incoming light rays 18 that are being focused by the lens 12 onto a portion of the image sensor 14, thereby increasing the light's intensity. (Other light rays are not shown to avoid clutter in the drawing.) This greatly increases the intensity on pixels corresponding to the location of the high-radiant-flux light source in the image. Thus, light that is harmless to a structural surface may have damaging intensity at the image sensor 14.

The imaging device proposed herein includes a two-image-plane optical system having a first focus that occurs in a gas that dissipates high-intensity light and a second focal that forms an image on an array of photodetectors. The gas is dense enough to dissipate most of the energy of a femtosecond laser pulse of potentially damaging intensity and conditioned to easily undergo dielectric breakdown when exposed to high-radiant-flux light that is less intense than a femtosecond laser pulse of potentially damaging intensity. Dielectric breakdown of the gas forms a conductive arc that dissipates incoming light, thereby preventing the high-radiant-flux light from reaching the array of photodetectors. Several methods may be used for conditioning the gas to break down quickly when exposed to laser attack.

Dielectric breakdown occurs when the voltage applied across an electrical insulator exceeds the breakdown voltage. This results in the insulator becoming electrically conductive. Dielectric breakdown within a gas occurs when the dielectric strength of the gas is exceeded. Regions of intense voltage gradients can cause nearby gas to partially ionize and begin conducting. The voltage that induces dielectric breakdown of a gas is approximated by Paschen's Law. The mechanism behind this effect is based on the acceleration of free electrons to high energies so that collisions with other atoms lead to secondary free carriers. This starts an avalanche process, during which appreciable densities of free carriers can be built up within a short time. A plasma is formed, which can have a significant electrical conductivity. The plasma can be maintained by further current flow, which generates additional free carriers. Breakdown in air and in other transparent media can be initiated by light having high optical intensity. The intensity required for dielectric breakdown depends on the pulse duration. Laser-induced dielectric breakdown is possible at lower intensity levels if the gas pressure is increased.

Figure 2:
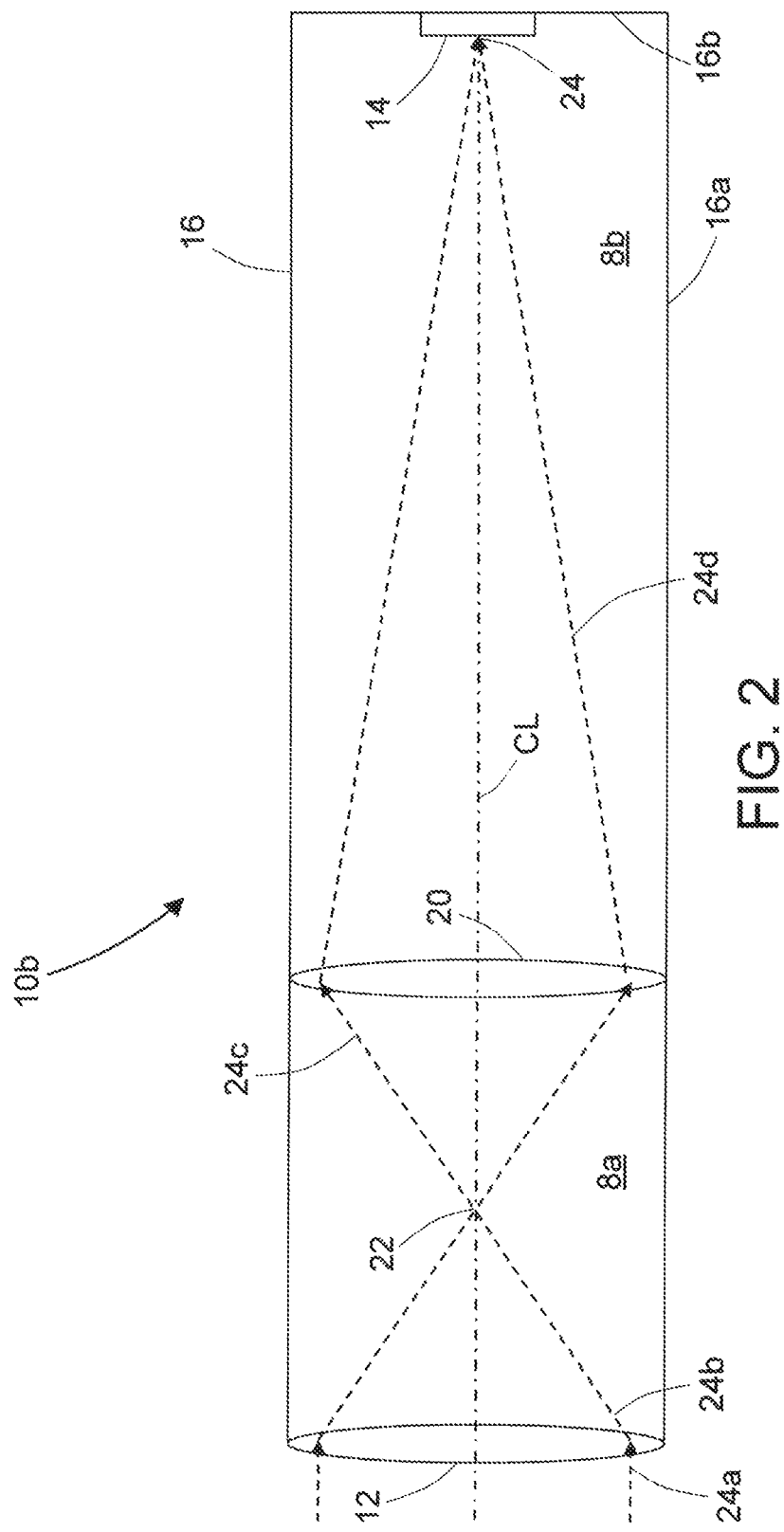
FIG. 2 is a diagram depicting structural and functional aspects of an imaging device having two image planes in accordance with one embodiment.

FIG. 2 is a diagram depicting structural and functional aspects of an imaging device 10b having two image planes in accordance with one embodiment. The imaging device 10b includes a lens tube 16 comprising a wall 16a that surrounds a volume of space and an end wall 16b that closes one end of the wall 16a. The imaging device 10b further includes an objective lens (hereinafter "first lens 12") that closes the other end of the wall 16a that is closest to the scene being imaged. The first lens 12 is supported by the lens tube 16 at or near the opening at the other end of wall 16a. The first lens 12 has a first focal length and forms an image in a first image plane 22 that is perpendicular to a centerline CL (also referred to herein as the "optical axis") of the lens tube 16 and intersects that centerline CL. The imaging device 10b further includes an image-erecting lens (hereinafter "second lens 20") that is supported by the lens tube 16 at a position along the centerline CL which is closer to the position of the first lens 12 than to the end wall 16b. The second lens 20 has a second focal length that is greater than the first focal length and forms an image in a second image plane 24 that is perpendicular to the centerline CL of the lens tube 16 and intersects that centerline CL at the image sensor 14. The second lens 20 receives light from the first lens 12 and is separated from the first lens 12 by a distance greater than the first focal length.

The imaging device 10b further includes the image sensor 14 (e.g., an array of photodetectors) that is supported by the end wall 16b of the lens tube 16 at a location such that the photoconductive surfaces of the image sensor 14 lie in the second image plane 24. The second lens 20 focuses light received from the first lens 12 onto the image sensor 14. The image sensor 14 may comprise a staring focal plane array, such as a charge coupled device (CCD) sensitive to visible or infrared wavelengths. In the alternative, it can be a single-pixel camera (compressive imaging system), an imaging photomultiplier, a vidicon tube, a photochemical film, or others.

Still referring to FIG. 2, the presence of the second lens 20 inside the lens tube 16 forms a first chamber 8a and a second chamber 8b. The lens tube 16, first lens 12 and second lens 20 form chamber 8a, while the lens tube 16 and second lens 20 form chamber 8b. As used herein, the term "chamber" refers to an enclosed space, not the physical structure that encloses that space.

In accordance with the embodiments disclosed herein, the first chamber 8a is filled with a gas that consists of one or more elemental gases. The selected gas contains atoms that are physically large, easy to ionize, and have a large number of electrons. For example, the gas may include xenon or krypton, which are called inert gases or noble gases. As used herein, the term "elemental gases" includes inert gases as well as elemental gases which are not inert gases, such as tritium. The amount of gas in the chamber is chosen to provide higher pressure than sea level air (hereinafter "standard atmosphere").

Still referring to FIG. 2, if the incoming parallel light rays do not have a high radiant flux, then the parallel light 24a entering at the first lens 12 will be focused by the first lens 12, producing a converging cone 24b of light. The converging cone 24b of light becomes a diverging cone 24c of light as the light passes through the first image plane 22. The diverging cone 24c of light impinges on the second lens 20. The second lens 20 then produces a converging cone 24d of light that impinges on the image sensor 14.

As previously described, the imaging device 10b has a two-image-plane optical system. The first image plane 22 occurs in the chamber 8a in a plane occupied by elemental gas. The gas inside chamber 8a is conditioned to dissipate an incoming laser pulse or other high-radiant-flux light. The image sensor 14 at the second image plane 24 senses light (i.e., performs the basic camera or telescope function). Laser protection occurs at the first image plane 22, where the elemental gas dissipates the laser pulse. In accordance with some embodiments, the ability to dissipate high-radiant-flux light inside the imaging device 10b may be enhanced by taking one or more of the following steps: decreasing the f-number of the first lens, varying the composition of the gas inside chamber 8a or increasing the gas pressure inside chamber 8a. In accordance with other embodiments, the ability to dissipate high-radiant-flux light inside the imaging device 10b may be enhanced by increasing the free electron density or generating an electric field at the first image plane 22. Each feature contributes to the ability to block a laser pulse, whether on the femtosecond scale or at somewhat longer time scales.

Femtosecond lasers interact with matter via multi-photon absorption. The light is so intense that several photons, each only a few wavelengths long, concurrently pass through the electron shell of an atom. If the photons collectively have enough energy to eject an electron, the atom becomes ionized. In solid matter, the laser pulse ejects a wave of electrons from the surface. The ions follow, attracted by the cloud of electrons. Thus, the laser pulse strips a layer of atoms from the surface. Repeated pulses strip more atoms, eventually eroding the surface and causing the device to fail. The imaging devices proposed herein block the adverse effects of high-radiant-flux light in several ways.

One advantageous feature of the imaging device 10b proposed herein is that the first focal length to the first image plane 22 is shorter than the second focal length to the second image plane 24. As a result, light is focused with much higher intensity at the first image plane 22 than at the second image plane 24. In the example depicted in FIG. 2, assuming that the f-number of the first focal length is 0.7 and the f-number of the second focal length is 2.5, then the intensity at the first image plane 22 will be greater than the intensity at the second image plane 24 by a factor of $(2.5/0.7)^2=12.8$. A more realistic imaging sensor has a much higher f-number, e.g., f10 or even f20, for the second focus and a slightly higher f-number, e.g., f1, for the first focus. The intensity ratio may thus be on the order of 100 or even 400. That means the leading edge of a laser pulse, though too weak to eject atoms from a focal plane array (for example), thoroughly ionizes gas near the first image plane 22. That ionized gas dissipates and/or scatters subsequent parts of the laser pulse.

The benefit is actually better than the intensity ratio. The probability of ejecting an electron by multi-photon absorption grows exponentially as a function of the optical intensity by a power of n, where n is the number of photons needed to provide enough energy for electron ejection. Red is a typical laser color; a photon of red light has ~2 eV of energy. The ionization energy for xenon is about 12 eV, so n=6. Thus, an intensity ratio of 100 gives a $(100)^6=1$ trillion times greater chance to ionize an atom.

Another feature of the imaging device proposed herein is the use of elemental gases having large atoms. An elemental gas having large atoms (such as xenon) is superior for two reasons.

(1) Large atoms have lower ionization energy. (As used herein, the term "ionization energy" means the minimum amount of energy required to remove the most loosely-bound electron, the valence electron, of an isolated neutral gaseous atom.) For xenon, the ionization energy is 12.13 eV, whereas for helium, the ionization energy is 24.59 eV. The lower ionization energy reduces the light intensity at which the gas in the chamber begins to dissipate or scatter light. If the intensity is such that probability to ionize a particular xenon atom is $10^{-6}$, where n=6 for red light, then the probability to ionize a particular helium atom is about $10^{-12}$ because n=12 for helium.

(2) The large atoms of the elemental gas barrier have many electrons (e.g., 54 electrons for xenon). Removing each electron from an atom takes energy, and the last few electrons from inner shells require a large amount energy (e.g., thousands of electron-volts each). Thus, a high density of electrons means a given volume of the gas has more electrons to dissipate more energy from a laser pulse than a low-density gas would have, and the deeply bound inner electrons of heavy atoms like xenon multiply this benefit by dissipating more energy per electron after the outer electrons are stripped away. This allows energy absorption to continue in the rare cases when intensity is high enough to eject electrons where n>1000.

An optional feature of the imaging device proposed herein is to increase the pressure inside the gas-filled chamber. High pressure makes the gas denser. High density means there are more atoms in the volume where light is intense enough to cause multi-photon absorption, so (a) the gas can dissipate more energy from a femtosecond burst and (b) the gas forms a denser region of ionized gas to dissipate light later in the pulse or in subsequent pulses.

Lasers with longer (less-intense) pulses (e.g., pulses having a nanosecond or microsecond pulse duration) damage objects by a different mechanism than femtosecond pulses: longer pulses deposit a sharp burst of heat that makes the material expand, inducing structural stress that can damage the surface. These longer pulses also ionize gases by a different mechanism than the mechanism initiated by femtosecond pulses. First, there must be a free electron in the gas. The electric field of the laser pulse accelerates the free electron. If the free electron has gained enough energy from the electric field by the time when the free electron strikes an atom, the free electron knocks an electron free from the now-ionized atom.

Unlike dielectric breakdown in a direct current (DC) electric field, which is governed by Paschen's Law, the free electrons accelerate in one direction for only a short distance. When the laser's electric field reverses direction, the free electrons decelerate, stop, and begin to accelerate in the opposite direction. Thus, within a half cycle of the electromagnetic wave, a free electron must be able to (a) extract enough energy from the electric field to ionize an atom and (b) encounter the atom. If this occurs, then the first free electron from one atom engenders another free electron from another atom. Those two electrons are further accelerated, potentially striking more atoms. If that happens with higher average probability than the average probability of an electron recombining with an ion, then there is a cascade of ionization. After several iterations of strike-accelerate-strike, the gas turns opaque and blocks further laser light from passing through the gas. More specifically, the laser-induced dielectric breakdown transforms the incoming laser energy to other forms of energy which do not damage the image sensor 14.

In accordance with the embodiments disclosed herein, the imaging device is designed to promote dielectric breakdown by less-intense pulses in the ways previously described: (a) the first local length is less than the second focal length; (b) the elemental gas in chamber 8a has a large atomic structure and a lower ionization energy for the valence electron; and (c) the gas pressure inside chamber 8a is greater than standard atmosphere.

Figure 3:
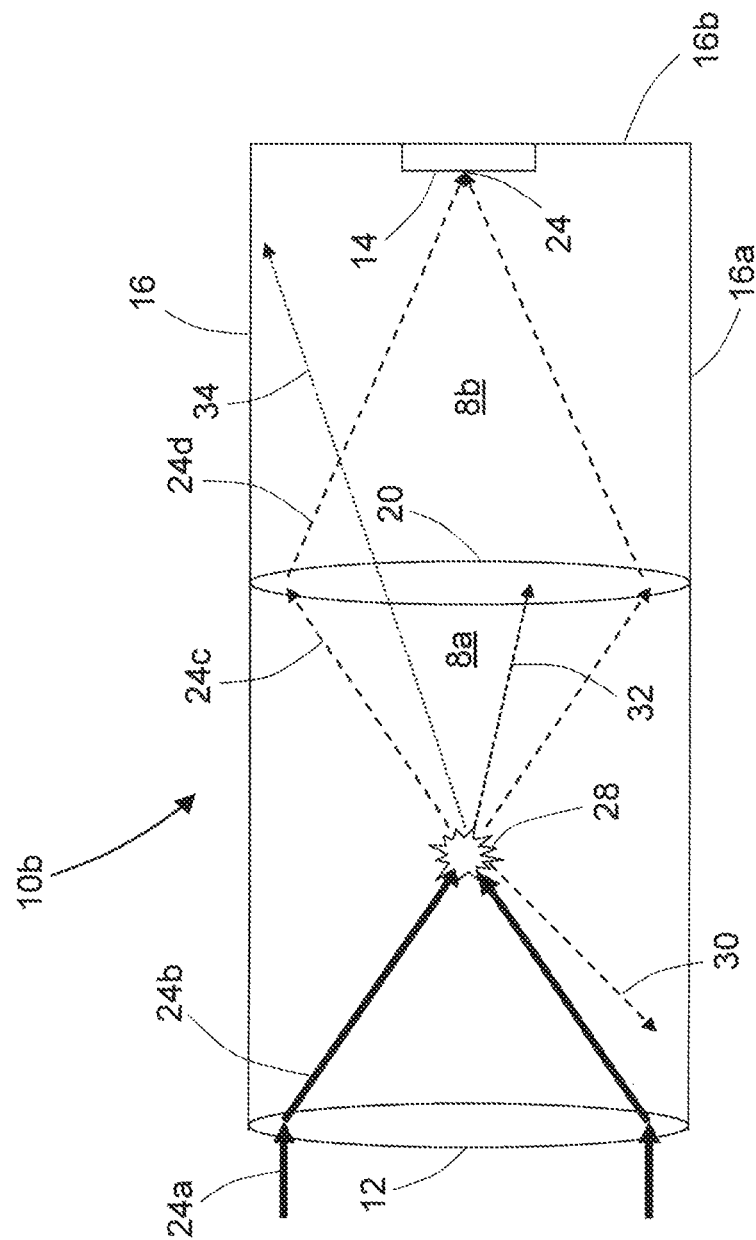
FIG. 3 is a diagram depicting structural and functional aspects of an imaging device having a chamber filled with gas that dissipates an incoming laser pulse by transforming the energy of the laser pulse into other forms of energy.

Blocking the laser pulse does not eliminate the pulse energy, but merely transforms it. The energy takes several forms. FIG. 3 is a diagram depicting structural and functional aspects of an imaging device 10b having a chamber 8a filed with elemental gas that dissipates an incoming laser pulse (indicated by boldface arrows) by transforming the energy of the laser pulse into other forms of energy. The converging cone 24b of pulsed laser light starts an avalanche process, during which appreciable densities of free carriers can be built up within a short time. A plasma 28 is formed, which can have a significant electrical conductivity. The plasma 28 can be maintained by further light absorption, which generates additional free carriers. Some energy is emitted from the hot plasma 28 as omnidirectional x-rays 34 (indicated by a dotted arrow in FIG. 3). The second lens 20 does not focus the x-rays 34 onto the image sensor 14, so even the portion of x-ray energy that is emitted in the forward direction causes no harm. In addition, some energy is emitted as omnidirectional ultraviolet radiation 32 (indicated by a dashed arrow in FIG. 3) which does not pass through the second lens 20. Also, some energy is emitted as omnidirectional incoherent light 30 (also indicated by a dotted arrow in FIG. 3). A portion of this omnidirectional incoherent light 30 (not indicated by an arrow in FIG. 3) is emitted toward the second lens 20 and is focused onto the image sensor 14, but the incoherent light does no harm because (a) the energy is only a fraction of the laser pulse energy and (b) the flash duration is much longer than the laser pulse duration, so thermal stress on the image sensor 14 is much lower. A small fraction of the energy produced by the laser-induced dielectric breakdown of the elemental gas is emitted as shock waves (not shown in FIG. 3). If the first and second lenses 12 and 20, respectively, and lens tube 16 are designed to survive the vibration of a mobile application, these components will likely survive the shock waves.

Non-elemental gases—meaning gases consisting of molecules, which in turn consist of two or more different chemical elements—are unsuitable for the laser protection technique disclosed herein. The laser pulse breaks molecules into atoms, e.g., $CO_2$ becomes ionized oxygen and carbon. Some recombines as $CO_2$, but some cokes out as an opaque coating on the lenses. As used herein, the term "elemental gas" means a gas in either of the following categories: inert gases and homonuclear diatomic gases. Single-element gases do not break into new opaque species; single-element gases recombine with electrons to form the same kind of atom they were before. Combinations of inert gases, like xenon with radon, also do not form opaque species. Neither do combinations of inert gases with a single other elemental species, like xenon plus tritium.

Further embodiments of an imaging device protected by a chamber filled with one or more elemental gases will now be described. A first class of embodiments includes aspects that make dielectric breakdown for nanosecond or millisecond lasers more likely by increasing the population of free electrons at the first image plane 22. A second class of embodiments includes aspects that make dielectric breakdown for nanosecond or millisecond lasers more likely by supplementing the electric field at the first image plane 22. Neither of the aforementioned augmentations is needed to handle femtosecond laser pulses. A third class of embodiments uses mirrors rather than lenses.

Embodiments with High Population of Electrons.

Dielectric breakdown can only occur when at least one free electron is present so the electric field of the laser pulse can accelerate the free electron to release more electrons. If there is a large initial population of free electrons, then breakdown occurs more quickly and easily. Various embodiments provide this large initial population.

In some embodiments, at least one piece of radioisotope is located in or near the chamber. Ionizing radiation from the radioisotope creates ion tracks in the gas. Each track typically comprises tens of thousands of ions and free electrons. In some embodiments, the radioisotope is a gas like radon or tritium that is a constituent of the gas in the chamber. Radon is nearly perfect: not only does radon emit alpha particles that deposit all their energy within a few centimeters of travel in a dense gas, but radon is also an inert monatomic gas with an atom larger than a xenon atom and with a lower ionization energy than xenon, so radon is well suited to blocking short laser pulses.

Figure 4:
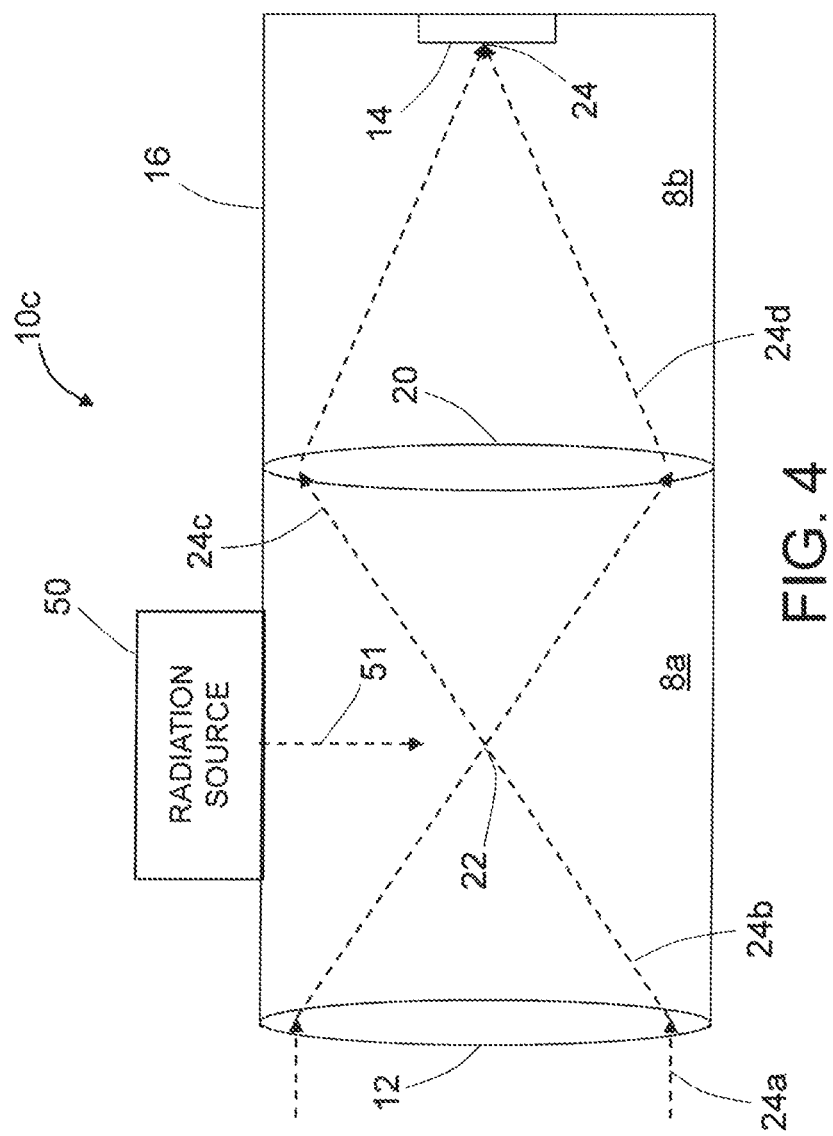
FIG. 4 is a diagram depicting structural and functional aspects of an imaging device that has a chamber filled with gas that dissipates an incoming laser pulse and a source of ionizing radiation.

In accordance with further embodiments, the gas inside the chamber 8a is ionized using a radiation source. FIG. 4 is a diagram depicting structural and functional aspects of an imaging device 10c having a chamber 8a filled with gas that dissipates an incoming laser pulse at a first image plane 22 and including a source of ionizing radiation 50 (hereinafter "radiation source 50") positioned to illuminate the first image plane 22.

In accordance with one embodiment, the radiation source 50 is a compact x-ray source (continuous or with a rapid pulse rate) that illuminates the first image plane 22 with x-rays. X-rays easily ionize gas, releasing electrons. For example, the x-rays may be emitted parallel to and aligned with the first image plane 22.

In accordance with other embodiments, the radiation source 50 is an ultraviolet (UV) lamp or UV light-emitting diode that illuminates the first image plane 22 with ultraviolet photons. Near-UV photons are not energetic enough to ionize most gases, so the UV embodiments use either mid- or far-UV, or include small amounts of an easy-to-ionize vapor like cesium in the gas-filled chamber. In UV embodiments, a UV-blocking filter is placed between the gas chamber 8a and the image sensor 14 (unless the second lens 20 is opaque to UV, in which case it acts as a UV filter).

One method for preventing high-radiant-flux light from damaging an image sensor in accordance with the above-described embodiments comprises: (a) emitting particles or electromagnetic radiation into a volume of gas inside a lens tube, wherein the gas includes a sufficiently high fraction of elemental gas or elemental gases such that dielectric breakdown will occur in the gas when exposed to a laser pulse of potentially damaging intensity during emission of the particles or the electromagnetic radiation; (b) focusing incoming non-high-radiant-flux light in a first image plane within the lens tube; (c) subsequent to step (b), focusing the non-high-radiant-flux light in a second image plane at an image sensor inside the lens tube; and (d) subsequent to step (c), focusing incoming high-radiant-flux light in the first image plane, thereby inducing dielectric breakdown in the gas that transforms the high-radiant-flux light into other forms of energy.

Embodiments with Electric Field Perpendicular to Optical Axis.

Dielectric breakdown occurs when a large electric field accelerates free electrons strongly enough that when the free electrons collide with a gas atom, the free electrons knock an electron out of the atom, and the resulting new free electron gets accelerated enough to repeat the process with other atoms. Unassisted laser breakdown occurs when the electric field of the laser beam is strong enough to cause this ionization avalanche in half of a wave cycle. To cause an ionization avalanche in one half wave cycle requires a very intense laser beam. One class of embodiments adds an electric field that is not quite strong enough to sustain a breakdown, i.e., just below the threshold determined by Paschen's Law. When a laser beam reaches the first image plane 22, the laser's electric field adds to the other electric field. The vector sum of the two electric fields is large enough to accelerate an electron to high enough energy to free another electron. This is true only during half of the wave cycle, when the E-field of the laser is in the same direction as the DC field, but that suffices: in most applications, a reliable breakdown and electron amplification in half the cycle is better rather than no breakdown or amplification during any part of the cycle.

Figure 5:
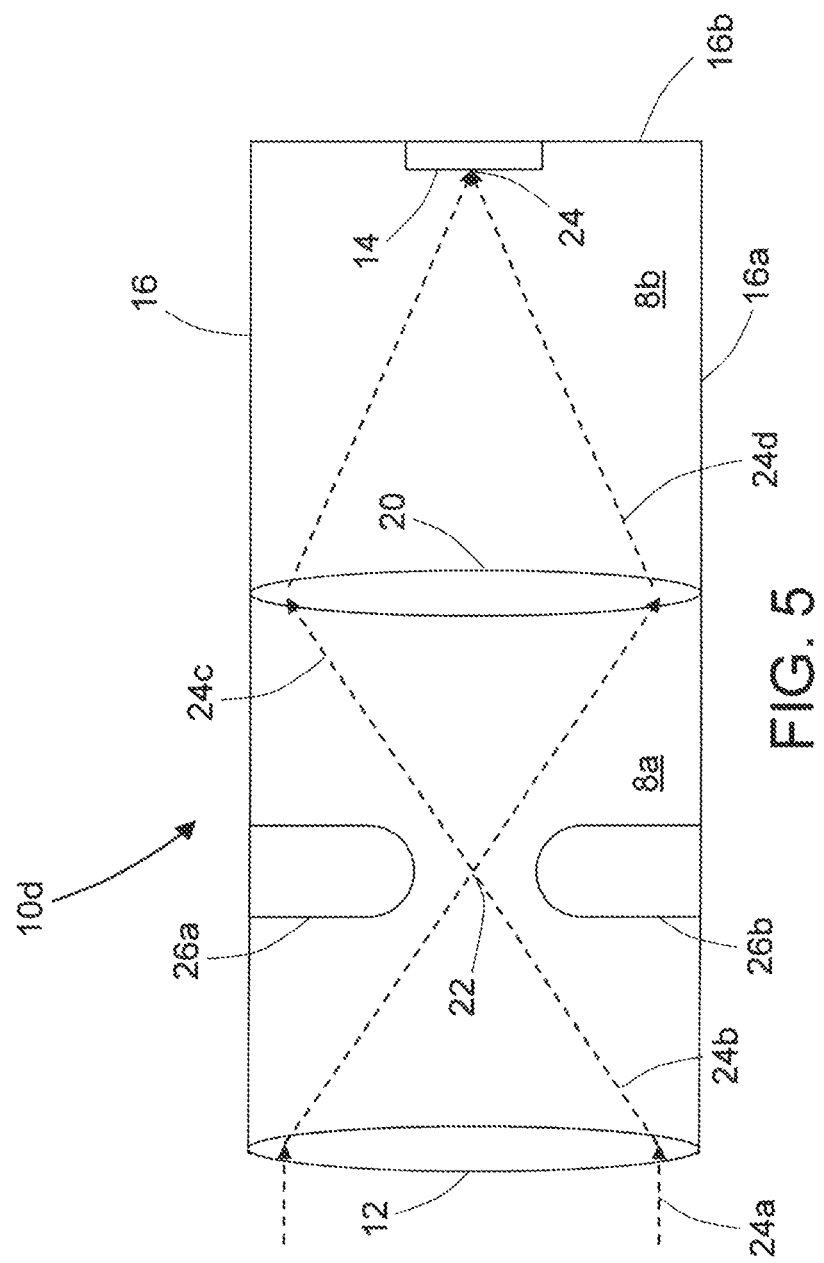
FIG. 5 is a diagram depicting structural and functional aspects of an imaging device that has a chamber filled with gas that dissipates an incoming laser pulse e plane and electrodes for creating an electric field that adds to the electric field of the laser pulse.

In some embodiments, the electric field is a DC field created by two electrodes on opposite sides of the gas-filled chamber. FIG. 5 is a diagram depicting structural and functional aspects of an imaging device 10d having a chamber 8a filled with gas that dissipates an incoming laser pulse at a first image plane 22 and that includes electrodes 26a and 26b for creating an electric field that adds to the electric field of the laser pulse in accordance with one embodiment. The tips of the electrodes 26a and 26b are smooth and rounded to avoid creating arcs. The electrodes 26a and 26b are attached to the lens tube 16 at diametrally opposed positions. The electrodes 26a and 26b are connected to a voltage source (not shown in the drawings).

In other embodiments, the electric field produced inside the chamber 8a is a DC field created by a printed circuit board 52 (see FIG. 6) that is connected to a voltage source (not shown). In accordance with one proposed implementation, the printed circuit board 52 includes two interleaved conductor combs 54a and 54b deposited on a transparent substrate 46. The conductor comb 54a comprises a base electrical conductor 44a connected to the positive terminal of the voltage source; the conductor comb 54b comprises a base electrical conductor 44b connected to the negative terminal of the voltage source. The conductor comb 54a further comprises a first plurality of mutually parallel conductive comb teeth (only three comb teeth 48a-48c are shown) that are connected and extend perpendicular to the base electrical conductor 44a; the conductor comb 54b further comprises a second plurality of mutually parallel conductive comb teeth (only three comb teeth 48d-48f are shown) that are connected to and extend perpendicular to the base electrical conductor 44b. In the example depicted in FIG. 6, comb teeth 48a-48c are interleaved with comb teeth 48d-48f. In one proposed implementation, the comb teeth 48a-48f are mutually parallel and equally spaced. The advantage of using interleaved combs is that only a small voltage is needed to create the high electric fields needed to assist dielectric breakdown.

Figure 6:
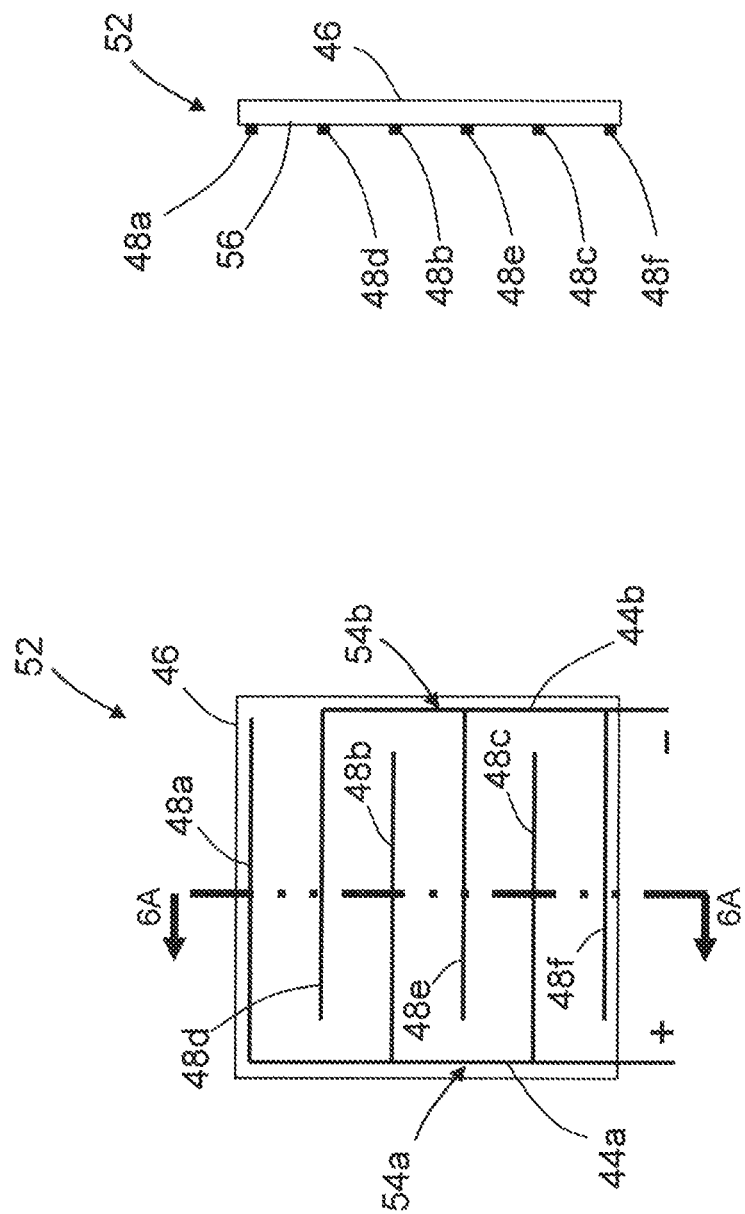
FIG. 6 is a diagram representing a plan view of an optically-transparent substrate having a pair of interleaved conductor combs printed thereon.

FIG. 6A is a diagram representing a sectional view of the printed circuit board 52 depicted in FIG. 6. The interleaved conductor combs 54a and 54b are printed on a surface 56 of the optically-transparent substrate 46. Only three comb teeth 48a-48c of conductor comb 54a and three comb teeth 48d-48f of conductor comb 54b are shown in FIGS. 6 and 6A. However, it should be appreciated that each conductor comb may have more than three comb teeth.

Figure 7:
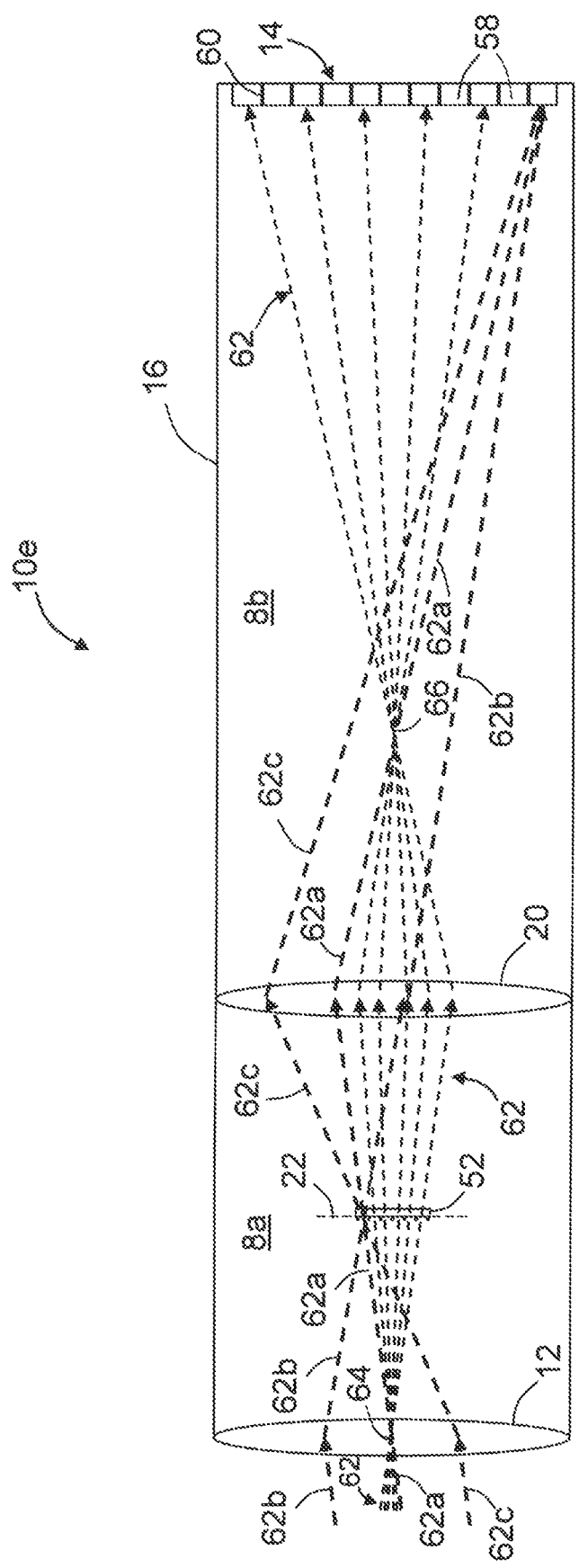
FIG. 7 is a diagram depicting structural and functional aspects of an imaging device that has a chamber filled with gas that dissipates an incoming laser pulse and interleaved conductor combs for creating an electric field that adds to the electric field of the laser pulse.

The printed circuit board 52 is located in the first image plane 22 inside the lens tube 16. FIG. 7 shows an imaging device 10e having a first chamber 8a between the first and second lenses 12 and 20 and a second chamber 8b between the second lens 20 and image sensor 14. The first image plane 22 is located in the first chamber 8a. The first chamber 8a is filled with gas that dissipates an incoming laser pulse.

In accordance with one proposed implementation, the printed circuit board 52 is placed inside the lens tube 16 such that the printed circuit board 52 is co-planar with the first image plane 22. As previously described, the interleaved conductor combs 54a and 54b create an electric field that adds to the electric field produced by a laser pulse.

The comb teeth 48a-48f are configured so that their positions at the first image plane 22 correspond to gaps 60 between rows of photodetectors 58 at the second image plane 24. More specifically, the interleaved conductor combs 54a and 54b are configured so that shadows produced by comb teeth 48a-48f on the surface of the image sensor 14 are aligned with respective gaps 60 between rows of photodetectors 58.

Figure 8:
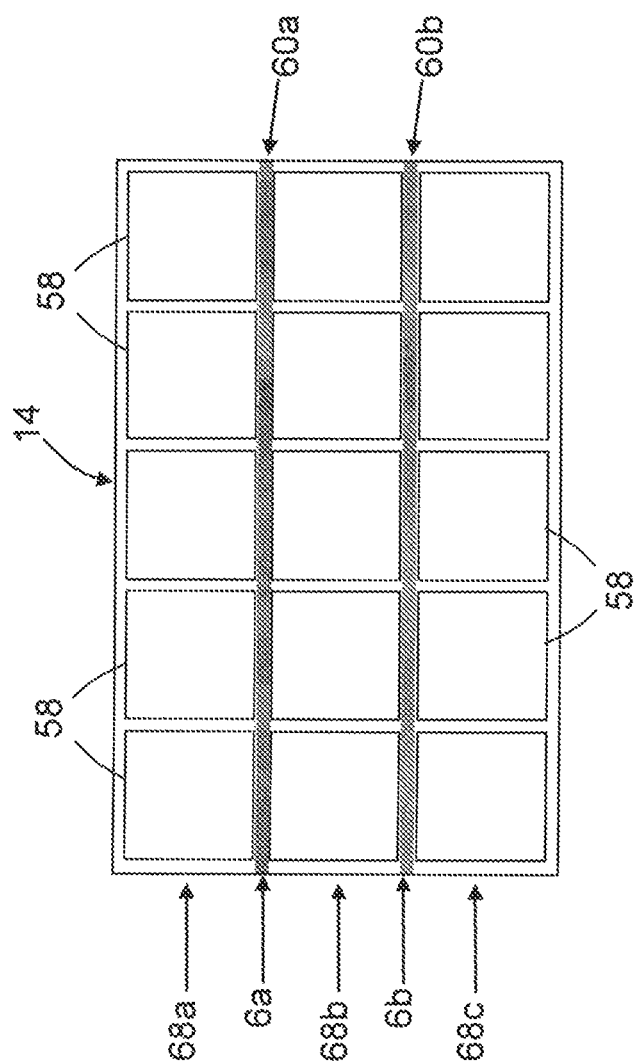
FIG. 8 is a diagram representing a plan view of several rows of photoconductors on which shadows produced by teeth of the interleaved conductor combs depicted in FIG. 6 are being projected on the gaps between rows.

FIG. 8 is a diagram representing a plan view of several rows 68a-68c of photodetectors 58 on which shadows produced by teeth of the interleaved conductor combs depicted in FIG. 6 are being projected on the gaps between rows. More specifically, a shadow 6a of one comb tooth is projected onto the gap 60a between rows 68a and 68b of photoconductors, while a shadow 6b of another comb tooth is projected onto the gap 60b between rows 68b and 68c of photoconductors of the image sensor 14. It is not necessary to have a one-to-one correspondence between comb teeth and inter-row gaps. The goal is simply to reduce loss of light due to shadows of the comb teeth.

In actual practice, the width of a shadow on the surface of the image sensor 14 may not be precisely equal to the width of the gap between adjacent rows of photodetectors. The shadows could be narrower than the gaps between rows of photodetectors. Alternatively, the shadows could be wider than the gaps between rows of photodetectors. This would be less than ideal because the wider shadows would reduce the light-collecting power of the photodetectors, but it may be a compromise solution in some cases because: (a) the comb teeth must be wide enough to carry enough electric current to support a brief electric arc; and (b) a tooth shadow at the second image plane is several times wider than a tooth at the first image plane.

In FIGS. 2-5, the dashed arrows indicate light from a single bright point, e.g., a distant laser, being focused on the first image plane 22. FIGS. 2-5 only show light rays that start off on parallel paths. For ease of illustration, those parallel rays are shown arriving in a direction that is parallel to the optical axis CL of the lenses. It should be appreciated that parallel rays may arrive from a different direction. The first lens 12 focuses parallel rays (i.e., all the rays arriving at the same angle) to a first common point on the first image plane 22.

In contrast, the dashed arrows in FIG. 7 shows the paths of a multiplicity of non-parallel (converging) light rays 62 arriving at a common point 64 at the center of the first lens 12 from a respective multiplicity of points, e.g., various points in a visual scene. For ease of illustration, FIG. 7 shows light rays 62 (including light ray 62a) passing through the center of the first lens 12. In general, light rays passing through the center of the first lens 12 (such as light ray 62a) follow straight paths as they pass a lens. The incoming light rays 62 converge at the center of the first lens 12 and then diverge as they exit the first lens 12. Some of these diverging rays impinge upon the printed circuit board 52. Rays that are not blocked by the comb teeth 48 on the printed circuit board 52 pass through the first image plane 22 and enter the second lens 20. The second lens 20 focuses light rays 62 to a second common point 66 located along the optical axis of the lenses. Subsequent to common point 66, the light rays 62 diverge and then impinge on the image sensor 14 in the second image plane 24. For the sake of illustration, FIG. 7 identifies a light ray 62a (represented by bold dashed arrows) that follows a first straight path through the first lens 12 and printed circuit board 52 and, after being bent by the second lens 20, follows a second straight path until light ray 62a impinges on image sensor 14.

FIG. 7 further includes bold dashed arrows representing the paths of light rays 62b and 62c which arrive at the first lens 12 from an off-axis direction and in parallel with light ray 62a. Light rays that pass off-center through the first lens 12 (such as light rays 62b and 62c) emerge from the first lens 12 traveling in different directions than the direction at which they entered. FIG. 7 identifies light ray 62a that follows a first straight path through the first lens 12 and light rays 62b and 62c that follow respective bent paths through the first lens 12. All three light rays 62a-62c are then bent by the second lens 20, which focuses light rays 62a-62c on a common point of impingement on the image sensor 14.

Assuming for the sake of illustration that the light rays 62a-62c seen in FIG. 7 belong to a high-radiant-flux laser pulse, the first lens 12 focuses the high-radiant-flux laser pulse onto the first image plane which is coincident with the printed circuit board 52 inside the gas-filled chamber 8a. If at the same time the interleaved conductor combs on the printed circuit board 52 are generating an electric field, that electric field adds to the electric field produced by the laser pulse, causing dielectric breakdown that prevents damage to the image sensor 14.

In accordance with some embodiments, the electric field generated in the chamber 8a is an alternating-current (AC) field that oscillates at radio frequencies. In this case the lens tube 16 has a conductive cylindrical wall 16a. The lens tube 16 may be configured to form a resonant cavity for the selected radio frequency (RF).

In some embodiments, the electric field oscillates at radio frequencies (as described above) and also has circular polarization. The circular polarization ensures that the field is aligned with the laser polarization during some portion of the RF cycle.

The structure corresponding to the "means for maintaining an electric field" recited in the claims includes the above-described electrode pair and pair of interleaved conductor combs and structural equivalents thereof.

Another method for preventing high-radiant-flux light from damaging an image sensor in accordance with the above-described embodiments comprises: (a) generating an electric field in a volume of gas inside a lens tube, wherein the gas includes a sufficiently high fraction of elemental gas or elemental gases such that dielectric breakdown will occur in the gas when exposed to a laser pulse of potentially damaging intensity during generation of the electric field; (b) focusing incoming non-high-radiant-flux light in a first image plane within the lens tube; (c) subsequent to step (b), focusing the non-high-radiant-flux light in a second image plane at an image sensor inside the lens tube; and (d) subsequent to step (c), focusing incoming high-radiant-flux light in the first image plane, thereby inducing dielectric breakdown in the gas that transforms the high-radiant-flux light into other forms of energy.

Embodiments with Mirrors.

Figure 9:
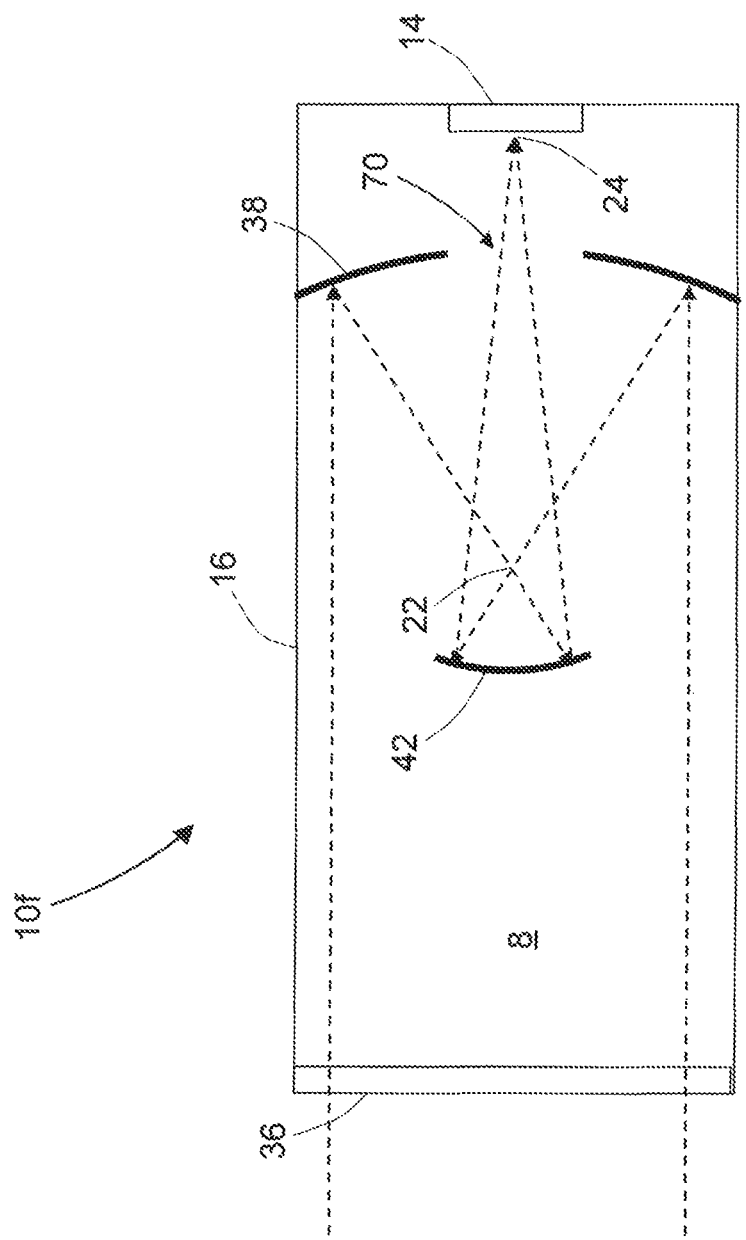
FIG. 9 is a diagram depicting structural and functional aspects of an imaging device that has a chamber filled with gas that dissipates an incoming laser pulse and a secondary mirror that focuses light reflected from a primary mirror onto an image sensor.

Reflective optics are often preferred for mobile sensors. FIG. 9 is a diagram depicting structural and functional aspects of an imaging device 10f having a chamber 8 filled with gas that dissipates an incoming laser pulse at a first image plane 22 and a concave secondary mirror 42 that focuses light reflected from a perforated primary mirror 38 onto an image sensor 14 situated in a second image plane 24 in accordance with a further embodiment.

More specifically, the imaging device 10f includes a lens tube 16 that partly bounds a volume of space and a window/corrector plate 36 supported by the lens tube 16. In one proposed implementation, the window/corrector plate 36 is an aspheric lens designed to correct the spherical aberration in the perforated primary mirror 38. The reflective optics include a perforated primary mirror 38 supported by the lens tube 16 to receive light from the window/corrector plate 36. The perforated primary mirror 38 has a first focal length that extends to the first image plane 22. In addition, the perforated primary mirror 38 has an opening 70 at its center.

The reflective optics in imaging device 10f further include a concave secondary mirror 42 positioned to receive light from the perforated primary mirror 38. The first image plane 22 is situated between perforated primary mirror 38 and concave secondary mirror 42. The concave secondary mirror 42 has a second focal length (greater than the first focal length) that extends to the second image plane 24. The imaging device 10f further includes an image sensor 14 supported by the lens tube 16 to receive light from the concave secondary mirror 42. The image sensor 14 is disposed within the volume of space 8 with is surface coincident with the second image plane 24. The perforated primary mirror 38, concave secondary mirror 42 and image sensor 14 are aligned along the optical axis of the imaging device 10f.

During operation of the imaging device 10f, some of the incoming light impinges on and is reflected by the perforated primary mirror 38 toward the first image plane 22. After passing through first image plane 22, at least some of the light reflected by the perforated primary mirror 38 impinges on the concave secondary mirror 42. The light imaging impinging on the concave secondary mirror 42 is reflected through the opening 70 in the perforated primary mirror 38 and onto the image sensor 14.

The volume of space 8—including the space in the vicinity of first image plane 22—is occupied by a gas that consists of an elemental gas or elemental gases. In accordance with some embodiments, the gas consists of an inert gas of one element. In some proposed implementations, the inert gas has a mean molecular weight which is equal to or greater than the mean molecular weight of krypton. In the alternative, a mixture of inert gases of two or more elements may be employed. In accordance with other embodiments, the gas consists of an inert gas and an elemental gas that is not an inert gas. In one proposed implementation, the elemental gas that is not an inert gas is tritium.

Unlike Cassegrain or Newtonian optical systems, the optical system depicted in FIG. 9 has a concave secondary mirror 42. This arrangement allows the perforated primary mirror 38 to form the first image. (Cassegrain and Newtonian optical systems do not form an image prior to the secondary mirror. Such optical systems only form an image after the secondary mirror reflects the light.) Light reflected from the perforated primary mirror 38 passes through the first image plane 22 (where a laser pulse, if it occurs, ionizes the gas) before the reflected light impinges on the concave secondary mirror 42. The concave secondary mirror 42 focuses impinging light on the image sensor 14 (e.g., a focal plane array). The window/corrector plate 36 at the entrance keeps the gas in the volume of space 8.

Figure 10:
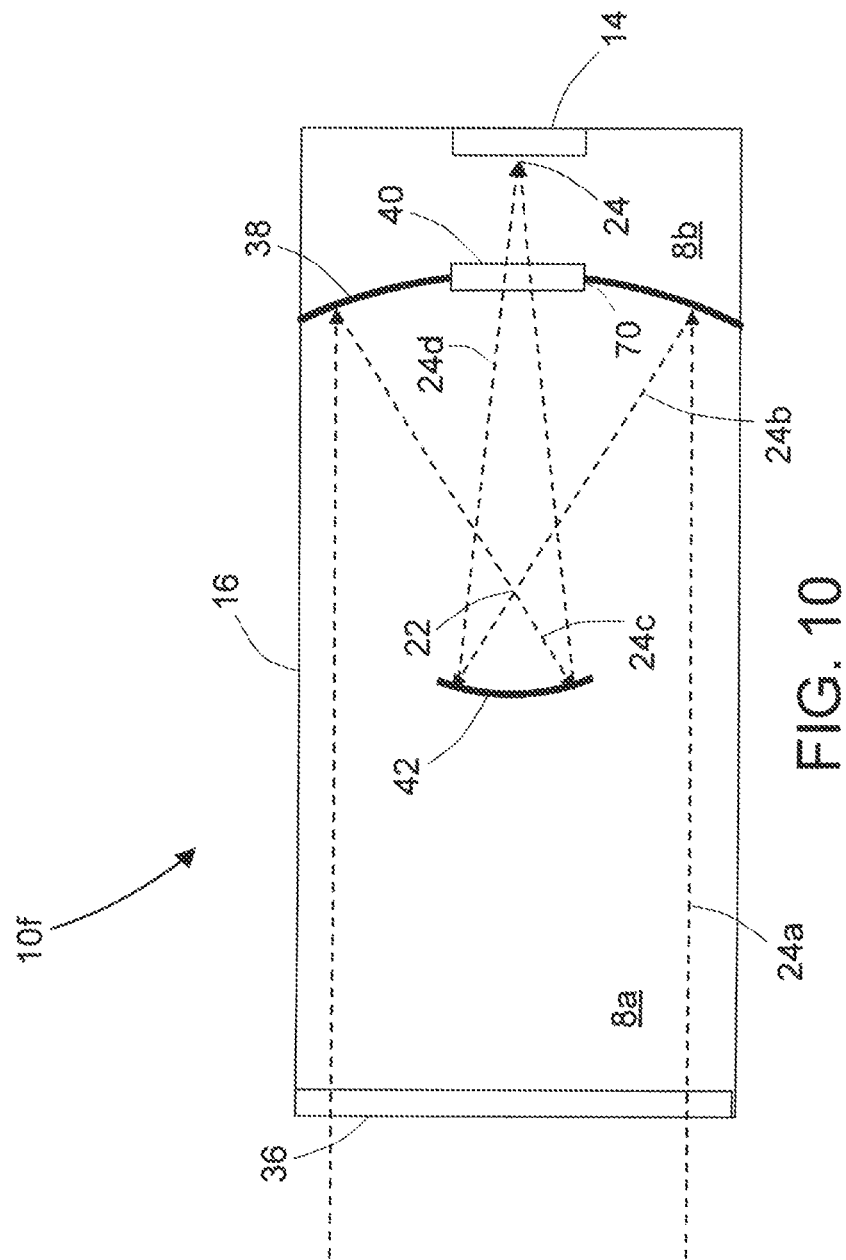
FIG. 10 is a diagram depicting structural and functional aspects of an imaging device similar to the imaging device depicted in FIG. 9 with the addition of a window in the primary mirror to keep the laser-dissipating gas away from the image sensor.

In accordance with an alternative embodiment depicted in FIG. 10, another window 40 is supported by the perforated primary mirror 38. The window 40 is configured to fit in and close the opening 70 in the perforated primary mirror 38. The window 40 is sealed to the perforated primary mirror 38, thereby dividing the volume of space seen in FIG. 9 into two chambers 8a and 8b, as seen in FIG. 10. In this embodiment, the chamber 8a is filled with elemental gas or elemental gases as previously described, while chamber 8b is filled with air. Thus, window 40 serves to keep the elemental gas away from the image sensor 14 and/or to block any ultraviolet radiation emitted by laser-induced arcs.

The ability to protect an imaging device against laser attack has numerous benefits. Compared to replacing damaged optical sensors after a mission, the prevention of damage allows a mission to continue. Compared to filtering light that enters the sensor, the proposed gas barrier allows the full spectrum and full intensity of an image to reach the image sensor. This maximizes sensor performance. Compared to non-linear optical materials in the optical path, the imaging devices proposed herein have a broader spectral range, survive much higher intensity of light, respond fast enough to block a femtosecond laser, and recover in a few milliseconds so the sensor can continue operation.

While systems and methods for protecting imaging devices against high-radiant-flux light have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. An imaging device comprising:
a lens tube that partly bounds a volume of space;
a first lens supported by the lens tube and having a first focal length;
a second lens supported by the lens tube and positioned to receive light from the first lens, wherein the second lens is separated from the first lens by a distance greater than the first focal length; and
an image sensor supported by the lens tube and positioned to receive light from the second lens, wherein the image sensor is disposed within the volume of space,
wherein the lens tube and the first and second lenses bound a chamber filled with a gas that includes a sufficiently high fraction of elemental gas or elemental gases such that dielectric breakdown is configured to occur in the gas when exposed to a femtosecond laser pulse of potentially damaging intensity.

2. The imaging device as recited in claim 1, wherein the gas comprises an elemental gas that is an inert gas.

3. The imaging device as recited in claim 2, wherein the inert gas has a mean molecular weight which is equal to or greater than the mean molecular weight of krypton.

4. The imaging device as recited in claim 2, wherein the gas further comprises an elemental gas that is not an inert gas.

5. The imaging device as recited in claim 4, wherein the elemental gas that is not an inert gas is tritium.

6. The imaging device as recited in claim 1, wherein the second lens has a second focal length greater than the first focal length.

7. The imaging device as recited in claim 1, wherein a pressure of the gas inside the chamber is greater than one standard atmosphere.

8. The imaging device as recited in claim 1, further comprising means for maintaining an excess of free electrons in the gas that fills the chamber.

9. The imaging device as recited in claim 1, further comprising means for maintaining an electric field in the chamber.

10. The imaging device as recited in claim 9, wherein the image sensor comprises rows of photodetectors separated by gaps, and wherein the means for maintaining an electric field in the chamber comprise interleaved conductor combs having comb teeth spaced to produce shadows aligned with the gaps.

11. An imaging device comprising:
a lens tube that partly bounds a volume of space;
a window/corrector plate supported by the lens tube;
a perforated primary mirror supported by the lens tube and positioned to receive light from the window/corrector plate, wherein the perforated primary mirror has a first focal length;
a concave secondary mirror positioned to receive light from the perforated primary mirror and having a second focal length greater than the first focal length; and
an image sensor supported by the lens tube and positioned to receive light from the concave secondary mirror, wherein the image sensor is disposed within the volume of space,
wherein a portion of the volume of space disposed between the perforated primary mirror and the concave secondary mirror is filled with a gas that includes a sufficiently high fraction of elemental gas or elemental gases such that dielectric breakdown is configured to occur in the gas when exposed to a femtosecond laser pulse of potentially damaging intensity.

12. The imaging device as recited in claim 1, wherein the gas comprises an elemental gas that is an inert gas.

13. The imaging device as recited in claim 12, wherein the inert gas has a mean molecular weight which is equal to or greater than the mean molecular weight of krypton.

14. The imaging device as recited in claim 12, wherein the gas further comprises an elemental gas that is not an inert gas.

15. The imaging device as recited in claim 11, further comprising a window disposed in an opening formed in the perforated primary mirror, wherein the lens tube, perforated primary mirror, and the window bound a chamber partly occupied by the image sensor.

16. The imaging device as recited in claim 11, wherein a pressure of the gas is greater than one standard atmosphere.

17. The imaging device as recited in claim 11, further comprising means for maintaining an excess of free electrons in the gas.

18. The imaging device as recited in claim 11, further comprising means for maintaining an electric field in a space between the concave secondary mirror and the perforated primary mirror.

19. A method for preventing high-radiant-flux light from damaging an image sensor, the method comprising:
  (a) emitting particles or electromagnetic radiation into a volume of gas inside a lens tube, wherein the gas includes a sufficiently high fraction of elemental gas or elemental gases such that dielectric breakdown will occur in the gas when exposed to a laser pulse of potentially damaging intensity during emission of the particles or the electromagnetic radiation;
  (b) focusing incoming non-high-radiant-flux light in a first image plane within the lens tube;
  (c) subsequent to step (b), focusing the non-high-radiant-flux light in a second image plane at an image sensor inside the lens tube; and
  (d) subsequent to step (c), focusing incoming high-radiant-flux light in the first image plane, thereby inducing dielectric breakdown in the gas that transforms the high-radiant-flux light into other forms of energy.

20. The method as recited in claim 19, wherein the particles are emitted by a piece of radioisotope in step (a).

21. The method as recited in claim 19, wherein the electromagnetic radiation is emitted by a radiation source in step (a).

22. The method as recited in claim 19, wherein the gas comprises an inert gas having a mean molecular weight which is equal to or greater than the mean molecular weight of krypton.

23. The method as recited in claim 22, wherein the gas further comprises an elemental gas that is not an inert gas.

24. A method for preventing high-radiant-flux light from damaging an image sensor, the method comprising:
  (a) generating an electric field in a volume of gas inside a lens tube, wherein the gas includes a sufficiently high fraction of elemental gas or elemental gases such that dielectric breakdown will occur in the gas when exposed to a laser pulse of potentially damaging intensity during generation of the electric field;
  (b) focusing incoming non-high-radiant-flux light in a first image plane within the lens tube;
  (c) subsequent to step (b), focusing the non-high-radiant-flux light in a second image plane at an image sensor inside the lens tube; and
  (d) subsequent to step (c), focusing incoming high-radiant-flux light in the first image plane, thereby inducing dielectric breakdown in the gas that transforms the high-radiant-flux light into other forms of energy.

* * * * *